(12) United States Patent
Schumann (10) Patent No.: US 12,510,741 B2
(45) Date of Patent: Dec. 30, 2025

(54) METHOD FOR EXAMINING A FLUORESCENT SAMPLE, MICROSCOPE SYSTEM AND COMPUTER PROGRAM

(71) Applicant: LEICA MICROSYSTEMS CMS GMBH, Wetzlar (DE)

(72) Inventor: Christian Schumann, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 177 days.

(21) Appl. No.: 18/562,393

(22) PCT Filed: May 23, 2022

(86) PCT No.: PCT/EP2022/063884
§ 371 (c)(1),
(2) Date: Nov. 20, 2023

(87) PCT Pub. No.: WO2022/243562
PCT Pub. Date: Nov. 24, 2022

(65) Prior Publication Data
US 2024/0241359 A1 Jul. 18, 2024

(30) Foreign Application Priority Data
May 21, 2021 (EP) .................................. 21175448

(51) Int. Cl.
*G02B 21/16* (2006.01)
*G01N 21/64* (2006.01)
*G02B 21/36* (2006.01)

(52) U.S. Cl.
CPC ......... *G02B 21/16* (2013.01); *G01N 21/6408* (2013.01); *G01N 21/6458* (2013.01); *G02B 21/365* (2013.01)

(58) Field of Classification Search
None
See application file for complete search history.

(56) References Cited

U.S. PATENT DOCUMENTS 6,671,624 B1 * 12/2003 Dunlay .................... B82Y 5/00
422/68.1
7,117,098 B1 * 10/2006 Dunlay .............. G01N 21/6428
382/165

(Continued)

FOREIGN PATENT DOCUMENTS

JP 2009014980 A 1/2009

OTHER PUBLICATIONS

Jonkman James et al: "Tutorial: guidance for quantitative confocal microscopy", Nature Protocols, Nature Publishing Group, GB, vol. 15, No. 5, Mar. 31, 2020 (Mar. 31, 2020), pp. 1585-1611, XP037111848.

(Continued)

*Primary Examiner* — David P Porta
*Assistant Examiner* — Djura Malevic
(74) *Attorney, Agent, or Firm* — LEYDIG, VOIT & MAYER, LTD.

(57) ABSTRACT

A method for examining a sample containing a target fluorophore j using a fluorescence microscope includes acquiring a series of sample images over an acquisition time interval, and adjusting an illumination parameter $P_k$ in a plurality of iteration steps n during the acquisition time interval to different set values. The series of sample images are acquired after adjusting the illumination parameter $P_k$ in at least some of the plurality of iteration steps n. The method further includes determining a bleaching behaviour descriptor $\kappa_j$ indicative of a bleaching behaviour of the target fluorophore j and a fluorescence response descriptor $I_j$ indicative of a fluorescence response of the target fluorophore j for the set values of the illumination parameter $P_k$. The illumination parameter $P_k$ is adjusted based on the bleaching behaviour descriptor $\kappa_j$ and the fluorescence response descriptor $I_j$ as determined in a preceding one of the plurality of iteration steps n.

14 Claims, 3 Drawing Sheets

(56) References Cited

U.S. PATENT DOCUMENTS

| | | | | |
|---|---|---|---|---|
| 7,471,817 | B2* | 12/2008 | Olschewski | G06T 7/0012 |
| | | | | 382/133 |
| 7,593,158 | B2* | 9/2009 | Wilhelm | G02B 21/0076 |
| | | | | 359/385 |
| 7,978,258 | B2* | 7/2011 | Christiansen | H04N 23/73 |
| | | | | 348/364 |
| 8,194,247 | B2* | 6/2012 | Sun | G01N 21/6458 |
| | | | | 356/317 |
| 8,294,897 | B2* | 10/2012 | Power | G02B 21/0076 |
| | | | | 356/417 |
| 9,057,879 | B2* | 6/2015 | Knebel | G02B 21/361 |
| 9,569,828 | B2* | 2/2017 | Munck | G02B 27/58 |
| 10,012,826 | B2* | 7/2018 | Knebel | G02B 21/367 |
| 10,200,625 | B2* | 2/2019 | Marcelpoil | H04N 23/70 |
| 10,310,243 | B2* | 6/2019 | Anhut | G02B 21/0076 |
| 10,914,680 | B2* | 2/2021 | Wang | G01N 21/6428 |
| 11,143,854 | B2* | 10/2021 | Foelling | G02B 21/0032 |
| 11,314,072 | B2* | 4/2022 | Knebel | G02B 21/06 |
| 11,635,609 | B2* | 4/2023 | Timmesfeld | G02B 21/16 |
| | | | | 348/79 |
| 12,253,663 | B2* | 3/2025 | Keul | G02B 21/242 |
| 12,313,830 | B2* | 5/2025 | Schumann | G01N 21/6458 |
| 2007/0133086 | A1* | 6/2007 | Wilhelm | G02B 21/0076 |
| | | | | 359/368 |
| 2007/0250274 | A1* | 10/2007 | Volkov | G01N 21/6408 |
| | | | | 702/22 |
| 2009/0323059 | A1* | 12/2009 | Sun | G02B 21/0024 |
| | | | | 382/128 |
| 2013/0107358 | A1* | 5/2013 | Knebel | G02B 21/006 |
| | | | | 359/385 |
| 2014/0093948 | A1* | 4/2014 | Durrer | G01N 21/17 |
| | | | | 362/555 |
| 2014/0118524 | A1* | 5/2014 | Munck | G02B 21/008 |
| | | | | 382/133 |
| 2014/0134110 | A1* | 5/2014 | Walton | A61K 49/0056 |
| | | | | 424/9.6 |
| 2015/0338625 | A1* | 11/2015 | Sieckmann | G02B 21/002 |
| | | | | 359/368 |
| 2016/0048012 | A1* | 2/2016 | Knebel | G02B 21/367 |
| | | | | 359/385 |
| 2017/0013181 | A1* | 1/2017 | Marcelpoil | H04N 23/73 |
| 2017/0082844 | A1* | 3/2017 | Hell | G02B 21/16 |
| 2018/0196246 | A1* | 7/2018 | Bares | G01J 3/0208 |
| 2019/0011367 | A1* | 1/2019 | Hell | G02B 21/0072 |
| 2019/0212536 | A1* | 7/2019 | Fahrbach | G02B 21/0076 |
| 2020/0218046 | A1* | 7/2020 | Knebel | G02B 21/0076 |
| 2020/0341253 | A1* | 10/2020 | Foelling | G01N 21/6458 |
| 2021/0333535 | A1* | 10/2021 | Timmesfeld | H04N 23/74 |
| 2022/0113531 | A1* | 4/2022 | Keul | G02B 21/0032 |
| 2022/0373464 | A1* | 11/2022 | Ritschel | G02B 21/0032 |
| 2023/0161143 | A1* | 5/2023 | Ritschel | G02B 21/0076 |
| | | | | 359/368 |
| 2023/0324662 | A1* | 10/2023 | Schumann | G02B 21/16 |
| | | | | 359/385 |
| 2023/0394632 | A1* | 12/2023 | Walter | G06T 5/70 |
| 2024/0251151 | A1* | 7/2024 | Tille | G02B 21/367 |

OTHER PUBLICATIONS

Neher R et al: "Optimizing imaging parameters for the separation of multiple labels in a fluorescence image", Journal of Microscopy, Blackwell Science, GB, vol. 213, No. PT 1, Jan. 1, 2004 (Jan. 1, 2004), pp. 46-62, XP003019027.

Benson D M. et al: "Digital Imaging Fluorescence Microscopy Spatial Heterogeneity of Photobleaching Rate Constants in Individual Cells", The Journal of Cell Biology, The Rockefeller University Press, US, vol. 100, No. 4, Jan. 1, 1985 (Jan. 1, 1985), pp. 1308-1324, XP009055740.

Douglas B Murphy et al: "Spectral Bleed-Through Artifacts in Confocal Microscopy", Jan. 1, 2006 (Jan. 1, 2006), XP055539249, Olympus, Japan, pp. 1-10.

Wikipedia: "Fluorescence imaging", Dec. 3, 2019 (Dec. 3, 2019), pp. 1-6, XP055803963, Wikipedia, US.

Cranfill Paula J et al: "Quantitative assessment of fluorescent proteins", Nature Methods, vol. 13, No. 7, Jul. 1, 2016 (Jul. 1, 2016), pp. 557-562, XP055955388, Springer Nature, Germany/UK.

UCL Wiki: "Olympus FluoView FV1200—Simple Confocal Image Acquisition—LMCB: Light Microscopy", Aug. 17, 2016 (Aug. 17, 2016), XP055955411, UCL, UK, pp. 1-10.

* cited by examiner

Fig. 3

METHOD FOR EXAMINING A FLUORESCENT SAMPLE, MICROSCOPE SYSTEM AND COMPUTER PROGRAM

CROSS REFERENCE TO RELATED APPLICATIONS

This application is a U.S. National Phase application under 35 U.S.C. § 371 of International Application No. PCT/EP2022/063884, filed on May 23, 2022, and claims benefit to European Patent Application No. EP 21175448.6, filed on May 21, 2021. The International Application was published in English on Nov. 24, 2022 as WO 2022/243562 A1 under PCT Article 21(2).

FIELD embodiments of the present invention relate to a method for examining a fluorescent sample, a microscope system, and a computer program.

BACKGROUND

Fluorescence microscopy is a special form of light microscopy. Fluorescence microscopy exploits the characteristic of fluorochromes to emit light after being excited with light of a certain, particularly different, wavelength. In fluorescence microscopy, for example, proteins of interest can be marked with fluorochromes via antibody staining or tagging with fluorescent proteins. Fluorescence microscopy allows for the determination of the distribution of single molecule species, their amount, and their localization, for example inside a cell. Furthermore, co-localization and interaction studies can be performed, ion concentrations can be observed using reversibly binding dyes, and cellular processes like endocytosis and exocytosis may be elucidated. In this connection, particularly so-called time-lapse experiments may be performed which generally may include acquiring a series of sample images over an acquisition time interval. Today, it is even possible to image sub-resolution particles with the help of fluorescence microscopy.

Conventional fluorescence microscopes require the user to have sufficient knowledge of how to properly adjust a number of different system parameters which may be interdependent and often may counteract or exclude each other. For the optimal setting of such system parameters, especially taking into account object-specific characteristics, the user has to rely on his or her experience with the use of such instruments. In any case, it has hardly been possible for a user to be able to achieve optimal imaging results without extensive relevant experience. This is particularly the case if examination of a microscopic sample is to include acquiring a series of sample images over an acquisition time interval, such as in time-lapse experiments.

SUMMARY

Embodiments of the present invention provide a method for examining a fluorescent sample containing a target fluorophore j using a fluorescence microscope. The method includes acquiring a series of sample images over an acquisition time interval, and adjusting an illumination parameter $P_k$ in a plurality of iteration steps n during the acquisition time interval to different set values. The series of sample images are acquired after adjusting the illumination parameter $P_k$ in at least some of the plurality of iteration steps n. The method further includes determining a bleaching behaviour descriptor $\kappa_j$ indicative of a bleaching behaviour of the target fluorophore j and a fluorescence response descriptor $I_j$ indicative of a fluorescence response of the target fluorophore j for the set values of the illumination parameter $P_k$ in at least some of the plurality of iteration steps n. The illumination parameter $P_k$ is adjusted, for at least some of the plurality of iteration steps n, based on the bleaching behaviour descriptor $\kappa_j$ and the fluorescence response descriptor $I_j$ as determined in a preceding one of the plurality of iteration steps n.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Embodiments of the present invention provide improved instrumentalities for examining a fluorescent sample containing a target fluorophore in a fluorescence microscope, which improves an image quality while protecting the sample from negative impacts from examination as far as possible.

In the method according to embodiments of the present invention, a series of sample images is acquired over an acquisition time interval. The method includes adjusting an illumination parameter during the acquisition time interval in a plurality of iteration steps to different set values, wherein the sample images are acquired after adjusting the illumination parameter in at least some of the iteration steps. That is, after each or some of the iteration steps, where an adjustment of the illumination parameter is or has been made, one or more of the total number of sample images may be acquired. It is also possible to acquire sample images only after some of said iteration steps, e.g. after each second, third, etc. iteration step, or if a certain criterion such as a detected fluorescence quality measure has been met.

According to an embodiment of the present invention, a bleaching behaviour descriptor indicative of a bleaching behaviour of said target fluorophore and a fluorescence response descriptor indicative of a fluorescence response of said target fluorophore is determined for the set value of the illumination parameter in at least some of said iteration steps, wherein said adjusting said set value of said illumination parameter is, for at least some of said iteration steps, performed on the basis of said bleaching behaviour descriptor and said fluorescence response descriptor determined in a preceding one of said iteration steps.

Hereinbelow, a number of variable letters or other abbreviated designations are used to indicate or further describe some parameters, values, numbers or descriptors, without any intention to necessarily limit the scope of the present invention to these specific designations whenever these are used. Among others, the operating value of the illumination parameter for examining the fluorescent sample or the illumination setting is referred to with $P_k$ where k represents a spectral component of the illumination, the target fluorophore is referred to with j, the iteration steps or the number thereof is referred to with n, the bleaching behaviour descriptor indicative of the bleaching behaviour of the target fluorophore is referred to with $\kappa_j$, and the fluorescence response descriptor indicative of the fluorescence response of the target fluorophore is referred to with $I_j$.

In embodiments of the present invention, the goal of attaining high signal-to-noise ratio images while minimizing phototoxicity and bleaching of the specimen is reached or at least approximated, wherein particularly during a time-lapse experiment in which a series of sample images is acquired over an acquisition time interval, uniform fluorescence responses and therefore sample images of comparable contrast and brightness can be provided despite photobleaching. Therefore, evaluating time-resolved reactions of a sample becomes easier according to embodiments of the present invention.

According to embodiments of the present invention, bleaching behaviour descriptors are determined for different set values of the illumination parameter, particularly for different light energies or intensities, in each of said iteration steps. Particularly when acquiring a series of sample images over an acquisition time interval, such an embodiment allows for acquiring images with identical, essentially identical, or at least comparable contrast or brightness values over the whole or at least a larger part of the acquisition time interval than in conventional methods.

According to an embodiment of the present invention, said bleaching behaviour descriptor $\kappa_j$ may particularly be determined as a rate constant or a coefficient indicative of a fluorescence decay of said target fluorophore j. That is, according to an embodiment of the present invention, and particularly in contrast to methods proposed according to the prior art, rate constants or other coefficients are determined for different illumination regimens and used to determine advantageous illumination conditions. This allows for a more selective illumination adjustment as compared to the prior art and an advantageous adaptation of the illumination regimens to the observed characteristics of photobleaching.

According to an embodiment of the present invention, determining said bleaching behaviour descriptor $\kappa_j$, i.e. particularly the rate constant, may particularly include determining abundances of said target fluorophore j in at least two electronic images taken from the sample at subsequent time points during at least some of said iteration steps n. This allows for an efficient time-resolved evaluation of photobleaching by particularly taking into account the last images taken, i.e. a current photobleaching behaviour.

The determination of said abundances may, according to an embodiment of the present invention, particularly include determining a statistical descriptor of a histogram of an abundance distribution of said target fluorophore j in said electronic images. The statistical descriptor is provided as an advantageous measure of the fluorescence characteristics of the sample.

In embodiments of the present invention, the sample may contain said target fluorophore j as one of two or more fluorophores, and determining said abundances of said fluorophore j may particularly include a spectral unmixing step applied to a fluorescence response generated by said two or more fluorophores. This allows for the examination of samples comprising different fluorophores in parallel, e.g. using white light sources, reducing the overall observation time and the sample exposure to excitation light.

In embodiments of the present invention, said fluorescence response descriptor $I_j$ may be determined as a photon number corresponding to a number of photons collected for said target fluorophore j in said images for said set value of the illumination parameter $P_k$. This allows for determining the fluorescence response descriptor on the basis of system components which may already be present or easily provided.

Determination of the photon number may be based on a direct measurement using a photon counting system and/or it may be calculated on the basis of a bit depth and full well depth of a camera chip in a detection system used in embodiments of the present invention, or other calibrated responses. For example, an analog charge integrating readout of a photomultiplier tube may also be calibrated, and therefore also such devices may be used. Such embodiments allow for a reliable determination or calculation of the photon number.

According to embodiments of the present invention, adjusting said set value of said illumination parameter $P_k$ may include an illumination parameter computation which may be performed on the basis of an optimization step minimizing a deviation between a determined value and a target value of said fluorescence response descriptor $I_j$. At least one of the illumination parameter computation, the determination of the fluorescence descriptor $I_j$, and the determination of the bleaching behaviour descriptor $\kappa_j$ may include filtering using at least one of a Kalman filter and a H-infinity filter, by which the value examined may be processed in an advantageous and robust fashion.

A deviation of the fluorescence response descriptor $I_j$ from a corresponding target value may, according to an embodiment, also be balanced with an upper limit for the bleaching behaviour descriptor $\kappa_j$. This and the former embodiments using a target value allow, particularly in time-resolved experiments in which a series of sample images is acquired over an acquisition time interval, to use common boundaries or optimization targets, for which reason the series of images may be acquired with an identical or comparable brightness or contrast, as mentioned.

In embodiments of the present invention, said illumination parameter $P_k$ may particularly be an illumination intensity, corresponding to an illumination energy influencing the fluorescence decay in the sample. An illumination intensity is a useful parameter for influencing the fluorescence responses. Embodiments of controllable spectral components representing the illumination parameters $P_k$ can be directly modulated narrow-band light sources like LEDs and diode lasers, acousto-optical tuneable filters (AOTF) and similar devices.

A microscope system provided according to an embodiment of the present invention comprises a fluorescence microscope and a control unit, the fluorescence microscope being adapted to examine a sample containing a target fluorophore, and the control unit being adapted to perform a method for examining said sample using said fluorescence microscope, said method including acquiring a series of sample images over an acquisition time interval. Said control unit is adapted to adjust an illumination parameter in in a plurality of iteration steps during the acquisition time interval to different set values, and to acquire the sample images after adjusting the illumination parameter $P_k$ in at least some of the iteration steps n. Said control unit is further adapted to determine a bleaching behaviour descriptor indicative of a bleaching behaviour of said target fluorophore and a fluorescence response descriptor indicative of a fluorescence response of said target fluorophore for the set value of the illumination parameter in at least some of said iteration steps, and to adjust said set value of said illumination parameter, for at least some of said iteration steps, on the basis of said bleaching behaviour descriptor and said fluorescence response descriptor determined in a preceding one of said iteration steps. As to further details, reference is made to the explanations above.

Embodiments of the present invention will be described with reference to the drawings.

Figure 1:
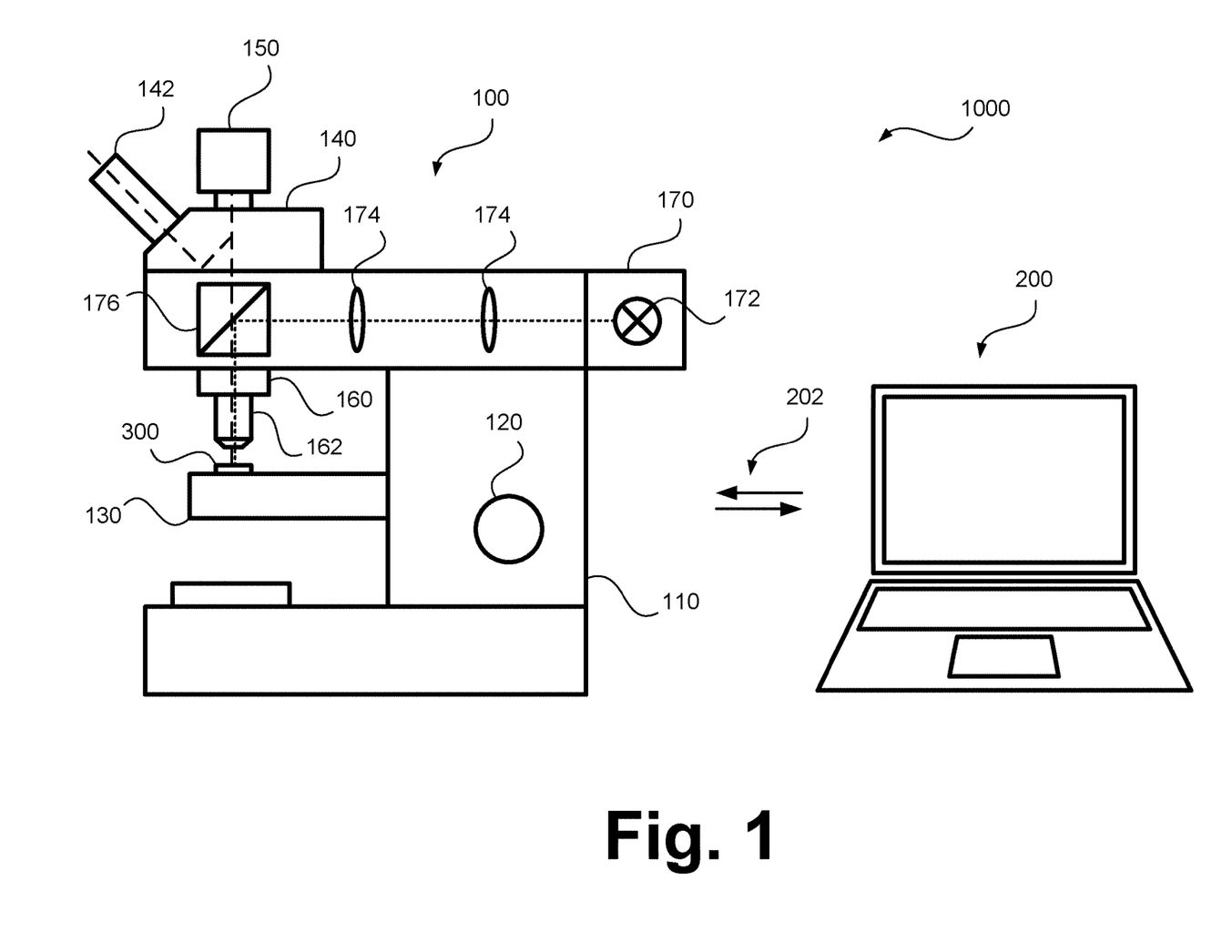
FIG. 1 schematically illustrates a fluorescence microscope system according to an embodiment of the present invention.

FIG. 1 schematically illustrates a fluorescence microscope system 1000 according to an embodiment of the present invention.

The fluorescence microscope 100 comprises, in the specific example illustrated, a microscope stand 110, focus adjustment means 120, a sample stage 130 carrying a sample 300, tube optics 140 with eyepieces 142, an electronic camera 150, a lens turret 160 to which at least one lens 162 is attached, a fluorescence illumination unit 170 and further components typical for a fluorescence microscope 100 which are not specifically indicated for reasons of conciseness.

The illumination unit 170 comprises a light source 172 and illumination optics commonly designated 174. Using e.g. a filter cube 176 comprising a dichroic beam splitter and/or excitation and emission filters, or using any other suitable apparatus as known in the field of fluorescence microscopy, light used to excite fluorescence in the sample 300 ("excitation light") is directed along an illumination beam path, as illustrated by a dotted line, through the lens 162 onto the sample 300. Light generated by fluorescence emission in the sample 300 ("detection light") passes, as illustrated with a dashed line, through the filter cube 176 and is directed to the eyepieces 142 and/or the electronic camera 150 by suitable deflection means in the tube optics not specifically illustrated.

Fluorescence microscopy, as generally known, particularly includes scanning techniques and widefield techniques, wherein embodiments of the present invention particularly relate to the latter, but are not limited thereto. The fluorescence microscope 100 may therefore be adapted to perform a widefield fluorescence technique.

Control units such as control computers for fluorescence microscopes may include personal computers which comprise interfaces for controlling the microscope hardware. Control computers according to embodiments of the present invention, as further explained below, however, may also be or include single-board computers, special computer hardware integrated into the microscope, or an entire computer cluster. Computer clusters, for example, may be used not only to control the fluorescence microscope but also to perform more extensive computationally intensive operations, such as visualization of multi-dimensional image data. Fluorescence microscopy may make use of single or multiphoton excitation processes.

The control unit 200 is, in the example illustrated in FIG. 1, provided as a laptop computer, but may take any other form as further explained above and below. The control unit 200 may be adapted to control a plurality of functions of the fluorescence microscope 100. For example, the control unit 200 may provide control signals adjusting at least one of a setting of the focus adjustment means 120, a position of the sample stage 130, an illumination intensity of the light source 172, and a setting of the filter cube 176. The control unit 200 may be adapted to evaluate and/or process a plurality of signals received from the fluorescence microscope 100, such as an image signal detected by the electronic camera 150. For providing and receiving signals, communication pathways 202 may be provided on the basis of wired and/or wireless connections, bus systems, and the like.

In other words, some embodiments of the present invention relate to a microscope system 1000 as shown and as described in connection with FIG. 1. A microscope 100 may be part of or connected to a system 1000. FIG. 1 shows a schematic illustration of a system 1000 configured to perform a method described herein. The system 1000 comprises a microscope 100 and a control unit in the form of a computer system 200. The microscope 100 is configured to take images and is connected to the control unit or computer system 200. The control unit or computer system 200 is configured to execute at least a part of a method described herein. The control unit or computer system 200 may be configured to execute a machine learning algorithm. The control unit or computer system 200 and the microscope 100 may be separate entities but can also be integrated together in one common housing. The control unit or computer system 200 may be part of a central processing system of the microscope 100 and/or the control unit or computer system 200 may be part of a subcomponent of the microscope 100, such as a sensor, an actor, a camera or an illumination unit, etc. of the microscope 100.

The control unit or computer system 200 may be a local computer device (e.g. personal computer, laptop, tablet computer or mobile phone) with one or more processors and one or more storage devices or it may be a distributed computer system (e.g. a cloud computing system with one or more processors and one or more storage devices distributed at various locations, for example, at a local client and/or one or more remote server farms and/or data centers). The control unit or computer system 200 may comprise any circuit or combination of circuits. In one embodiment, the control unit or computer system 200 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the control unit or computer system 200 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems.

The control unit or computer system 200 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The control unit or computer system 200 may also include a display device, one or more speakers, and a keyboard and/or controller, which can include a mouse, trackball, touch screen, voice-recognition device, or any other device that permits a system user to input information into and receive information from the control unit or computer system 200.

Due to the aforementioned complexity of adjusting fluorescence microscopes such as the fluorescence microscope 100, operating or system parameters may not optimally set by inexperienced users. Above all, ignorance of the sometimes very complicated interrelationships of various optical and electronic peripheral parameters of a fluorescence microscope are the cause of inadequate operation to date. If the adjustment of system parameters is not carried out optimally, the images taken may comprise a reduced image quality or a much too long adjustment procedure before the actual image acquisition will be required. This is relevant when acquiring a series of sample images over an acquisition time interval, such as in a time-lapse experiment, as the required frequency of image acquisition may not allow for extensive adjustment operations. Generally, an adjustment procedure before the actual image acquisition that is too long reduces the efficiency of a fluorescence microscope 100 and, moreover, may also lead to excessive wear of the light source 172 and/or the optical fibres exposed to the laser light, as well as possibly to degradation of the sample.

A problem being relevant in this connection is that a number of fluorescence objects bleach out during extended adjustment phases or when exposed to too high light energies during the actual experiment. The image quality, i.e. particularly the image contrast, of the images obtained in fluorescence microscopy is therefore generally the result of a trade-off between sample preservation, i.e. reducing photobleaching, and image quality that is not easily assessed, particularly by an inexperienced user. In time-lapse experiments, this may result in sample images acquired towards the end of an acquisition time interval to have reduced contrast or brightness as compared to sample images acquired at the beginning of the acquisition time interval, such that a comparison or evaluation of time-resolved processes using the fluorescence microscope 100 may be problematic.

This problem is addressed by embodiments of the present invention which will now further be described with reference to FIGS. 2 and 3 in particular.

Figure 2:
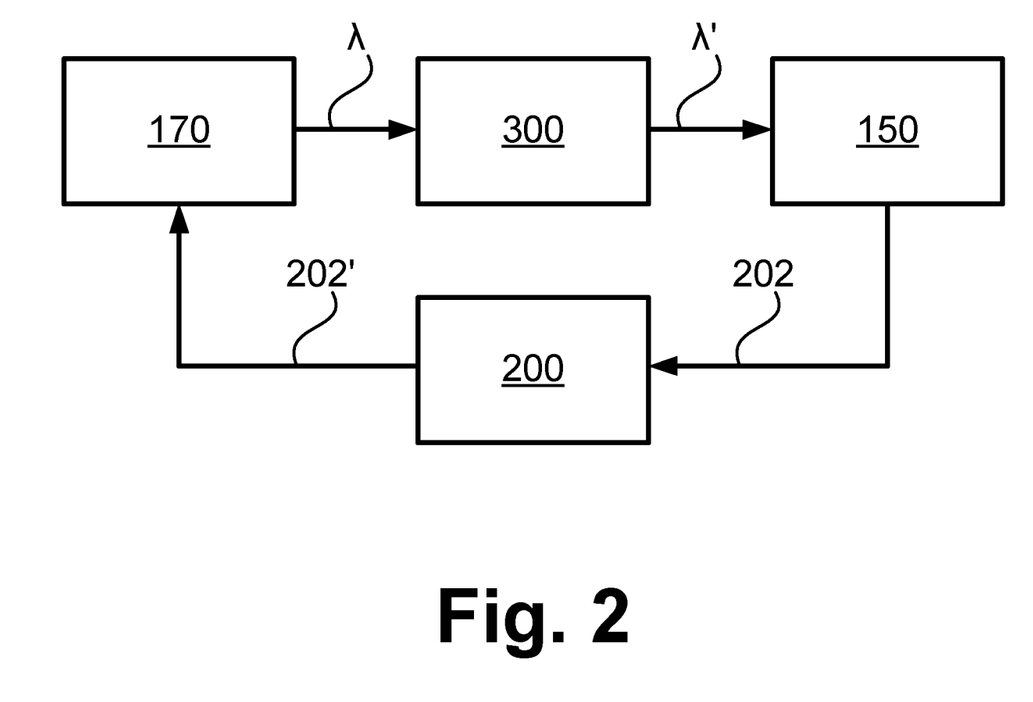
FIG. 2 schematically illustrates a method according to an embodiment of the present invention in the form of a block diagram.
Figure 3:
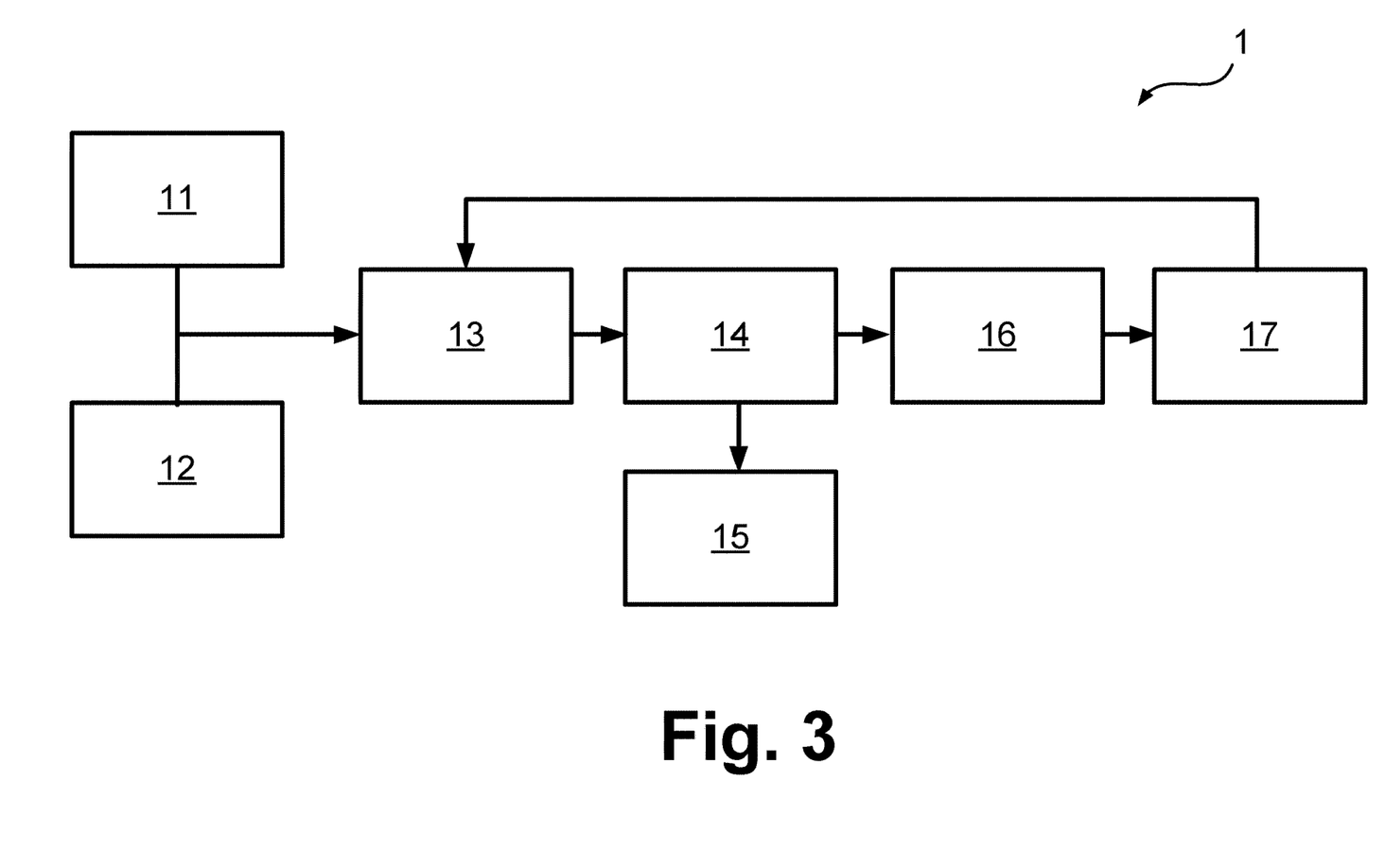
FIG. 3 schematically illustrates a method according to an embodiment of the present invention in the form of a block diagram.

FIG. 2 schematically illustrates a method according to an embodiment of the present invention in the form of a block diagram, and more specifically illustrates how, in such a method, which is also illustrated in more detail in FIG. 3, elements of a microscope system such as for example the microscope system 1000 as illustrated in FIG. 3, interoperate.

Embodiments of the present invention provide a control method that balances the signal-to-noise ratio in the images with the influence of photobleaching. While current illumination control methods do not take into account the influence of photobleaching, especially not the influence that higher-order effects have on the balance between an achievable signal-to-noise ratio and specimen bleaching, embodiments of the present invention provide instrumentalities taking into account these effects. An aspect of the present invention is not only to use a physical model for the control of light sources to attain a required signal-to-noise ratio (in a statistical sense), but also to measure the influence of illumination power on the dynamics of photobleaching of the specimen in a mathematical model and find a good balance between photobleaching and image quality. Embodiments of the present invention allow for an adjustment during a time-resolved experiment on the basis of evaluated descriptors.

The method shown in FIG. 2 is used for examining the sample 300 containing a target fluorophore and may be embodied in a fluorescence microscope such as the fluorescence microscope 100 shown in FIG. 1, or a corresponding system 1000. The method is used in connection with acquiring a series of sample images over an acquisition time interval, i.e. a time-lapse experiment.

The method includes adjusting an illumination parameter in a plurality of iteration steps, i.e. cyclically, as illustrated in FIG. 1, to different set values. Illumination light irradiated to the sample 300 using a fluorescence illumination unit such as the fluorescence illumination unit 170 according to FIG. 1 light is indicated with while light emitted from the sample 300 in response thereto is indicated $\lambda'$. In each of the cycles illustrated, i.e. in each of the iteration steps, this light $\lambda$ is adjusted in terms of one or more of said illumination parameters, such particularly in a light intensity, and in each adjustment step, a bleaching behaviour descriptor indicative of a bleaching behaviour of the target fluorophore in the sample 300 and a fluorescence response descriptor indicative of a fluorescence response of said target fluorophore is determined for the set value of the illumination parameter.

This adjustment is based on an evaluation of the fluorescence response $\lambda'$ over time, i.e. over several images taken by the electronic camera 150 which is used to record images corresponding to the fluorescence response $\lambda'$. The sample images of a time-series acquired over the acquisition time interval are taken after adjusting the illumination parameter, as further explained above, i.e. after each or at least some of the iteration steps in which the illumination parameter is adjusted, at least one of the sample images may be acquired. Sample images may or may not be identical to images used to evaluate the fluorescence response $\lambda'$ over time or may be part of such images.

The adjustment of said set value of said illumination parameter of the illumination light is, for at least some of said iteration steps shown, performed on the basis of the bleaching behaviour descriptor and said fluorescence response descriptor determined in a preceding one of said iteration steps. The bleaching behaviour descriptor may, as mentioned, be a rate constant of a fluorescence decay, and the fluorescence response descriptor may be, or may correspond, to an image quality such as a signal-to-noise ratio or an image contrast. In other words, in embodiments of the present invention the dynamics of photobleaching for different illumination parameters is evaluated.

Fluorescence photobleaching is not necessarily expected to follow a simple mono-exponential decay but to show more complicated dynamics. This is commonly attributed to the population and excitation of long-lived triplet states. The embodiments of the present invention, using the approach described, allow for a substantially better evaluation of photobleaching for different illumination parameters, taking into account these circumstances.

In embodiments or the present invention, therefore, the observed photobleaching effects may be counteracted by adjusting the illumination parameters. This means that when acquiring a series of sample images over an acquisition time interval, such an embodiment of the present invention allows for acquiring images with identical, essentially identical, or at least comparable contrast or brightness over the whole or at least a larger part of the acquisition time interval, which improves the comparability of these images and therefore the evaluation of time-resolved phenomena in the sample. As a complete time-resolved spectroscopic investigation is not feasible in an illumination control method for a fluorescence microscope, and a characterization of every fluorophore before imaging is not possible, embodiments of the current invention give a more general and advantageous guide to balancing signal-to-noise ratio and photobleaching as compared to the prior art.

In a non-limiting example, which is repeatedly referred to herein, said bleaching behaviour descriptor $\kappa_j$ is determined as a rate constant or a coefficient indicative of a fluorescence decay of said target fluorophore j. In this connection, a simple rate equation model for the fluorescence process with an instantaneous rate constant $\kappa_j$ for photobleaching may be used, whose solution is a simple exponential decay of the active fluorophore abundance $c_j$ over time t according to $$c_j(t) = c_j^{(0)} \exp(-\kappa_j t).$$

In the non-limiting example, single abundance values for the whole specimen can for example be determined by a quantile of the histogram of the fluorophore abundance distribution in the image. That is, a statistical descriptor of a histogram of an abundance distribution of said target fluorophore j in said electronic images may be determined, as already mentioned above. If there is crosstalk between the detection channels and the fluorophore emission spectra, the images may be spectrally unmixed by methods known from the art before histogram calculation, in embodiments of the present invention.

As already described in other words before, when recording a time series of fluorescence images, the rate constants for photobleaching can be determined by comparing the detected abundances in two successive images. Solving, in this example, $$\frac{\exp(\kappa_j \tau^{(n)}) [\exp(\kappa_j \tau^{(n-1)}) - 1]}{\exp(\kappa_j \tau^{(n)}) - 1} - \frac{c_j^{(n-1)} \tau^{(n-1)}}{c_j^{(n)} \tau^{(n)}} = 0$$

for $\kappa_j$ where $c_j^{(n)}$ and $\tau^{(n)}$ are the abundances and exposure times in frame n, gives an estimation of the photobleaching rate constant. In a simple approximation neglecting intra-frame bleaching, this can also be calculated as $$\kappa_j = \frac{c_j^{(n-1)} - c_j^{(n)}}{c_j^{(n)} \tau^{(n)}}.$$

In this model, the photobleaching is independent of the illumination power. However, as mentioned, fluorescence photobleaching does not follow a simple mono-exponential decay but shows more complicated dynamics, and for different reasons embodiments of the current invention take an alternative and more general approach.

First, it was realized here that the signal-to-noise ratio due to shot noise is influenced by illumination only by influencing the number of photons $I_j$ collected per fluorophore and frame, which can be extracted from the image data by spectral unmixing and histogram evaluation. This can be modelled using a mixing tensor $$M_{ijk} = \int Em_j(\lambda) \cdot Sens_i(\lambda) d\lambda \cdot \int Exc_j(\lambda') \cdot Ill_k(\lambda') d\lambda'$$

with $Em_j(\lambda)$ being the emission spectrum and $Exc_j(\lambda')$ being excitation spectrum of the fluorophore j, $Sens_i(\lambda)$ being the spectral sensitivity of channel i and $Ill_k(\lambda')$ being the illumination spectrum of light source k to give the detected fluorescence signal as $$I_j = c_j \cdot \tau \sum_{j=0}^{J-1} \sum_{k=0}^{K-1} M_{ijk} P_k$$

and the influence of the illumination setting $P_k$ measured in frame n is $$\frac{\partial I_j^{(n)}}{\partial P_k} = c_j \cdot \tau \sum_{j=0}^{J-1} M_{ijk}.$$

Therefore, in embodiments of the invention, said fluorescence response descriptor $I_j$ may be determined as a photon number corresponding to a number of photons collected for said target fluorophore j in said images for said set value of the illumination parameter $P_k$ as likewise mentioned before.

In the non-limiting example discussed here, a bleaching-independent signal-to-noise optimization can be performed by minimizing the deviation to a target fluorophore brightness $I_j^{(\infty)}$, for example by a Newton method $$P_k^{(n+1)} = P_k^{(n)} + \sum_{j=0}^{J-1} \left( \frac{\partial I_j^{(n)}}{\partial P_k} \right)_{jk}^{-1} \cdot \left( I_j^{(\infty)} - I_j^{(n)} \right).$$

Therefore, the illumination parameter computation provided according to an embodiment of the present invention may be performed on the basis of an optimization step minimizing a deviation between a determined value and a target value of said fluorescence response descriptor. A method to include an illumination-dependent bleaching in a control method may be to include higher-order bleaching effects phenomenologically using the next order in the Taylor expansion of the bleaching rate constants $\kappa_j$ with respect to the illumination setting $P_k$. Using the finite differences in the successive iteration steps, in a corresponding example, one can calculate changes in the bleaching rate constants and in the illumination settings as $$\Delta \kappa_j^{(n)} = \kappa_j^{(n)} - \kappa_j^{(n-1)}$$

$$\Delta P_k^{(n)} = \frac{\tau^{(n)} P_k^{(n)}}{\tau^{(n)} + \tau^{(n-1)}} + \frac{\tau^{(n-1)} (\tau^{(n-2)} - \tau^{(n)}) P_k^{(n-1)}}{(\tau^{(n)} + \tau^{(n-1)})(\tau^{(n-1)} + \tau^{(n-2)})} - \frac{\tau^{(n-2)} P_k^{(n-2)}}{\tau^{(n-1)} + \tau^{(n-2)}}$$

where an exposure-weighted mean for the illumination settings is present. On this basis, one can exploit Broyden's iterative approximation of the Jacobian $$\left( \frac{\partial \kappa_j}{\partial P_k} \right)^{(n)} = \left( \frac{\partial \kappa_j}{\partial P_k} \right)^{(n-1)} + \frac{\left( \Delta \kappa_j^{(n)} - \sum_{k=0}^{K-1} \left( \frac{\partial \kappa_j}{\partial P_k} \right)^{(n-1)} \Delta P_k^{(n)} \right) \Delta P_k^{(n)}}{\sum_{k=0}^{K-1} (\Delta P_k^{(n)})^2}$$

to use the dependence of the bleaching rate constants on the illumination parameters as a regularization to the illumination control when optimizing the signal-to-noise ratio via the deviation of the detected intensities.

This can be done by introducing (not necessarily fluorophore-specific) regularization constants $\lambda_j$ and using a Newton method $$P_k^{(n+1)} = P_k^{(n)} - \left[\frac{\partial I_j^{(n)}}{\partial P_k} \lambda_j \cdot \frac{\partial \kappa_j^{(n)}}{\partial P_k}\right]^{-1} \left[\begin{array}{c} I_j^{(\infty)} - I_j^{(n)} \\ \kappa_j^{(n)} \end{array}\right].$$

Since this equation system is most likely over-determined, one can solve the same via the singular value decomposition in a least-square sense.

The intensity-independent part of the bleaching rate constants cannot be independently influenced by the control of the illumination, but is directly related to the number of photons detected per frame, i.e. the signal-to-noise ratio in each image. For each detected photon that contributes to the signal-to-noise ratio, a percentage of bleaching has to be accepted. To maximize the number of frames in an experiment before completely bleaching the sample, the user has to reduce the signal-to-noise ratio requirements.

As mentioned, FIG. 3 provides further details of a method provided according to an embodiment of the present invention which is designated 1. The illustration of FIG. 3 places a focus of method steps while the illustration of FIG. 2 places a focus on the interoperation between system components.

The example shown in FIG. 3 starts with providing a "guess" of initial parameters in a step 11, e.g. based on or corresponding to an initial partial derivative of the bleaching behaviour descriptor, such as the rate constant $\kappa_j$, with respect to the illumination parameter, such as the illumination intensity or energy $P_k$, i.e. $\partial \kappa_j / \partial P_k$. Correspondingly, in a step 12, initial illumination settings are adjusted. The method then enters in a cyclical operation as illustrated by an arrow from step 17 to step 13 which may be completed or left when a series of sample images over an acquisition time interval has been taken and advantageous settings for each of the sample images have been found.

In step 13, the sample is illuminated with illumination light comprising the illumination parameter for the respective cycle n, such as a certain illumination intensity or energy $P_k^{(n)}$. In step 14, a fluorescence response such as a photon count $I_j^{(n)}$ is determined and, in a step 15, image data correspondingly obtained are acquired. These image data may resemble sample images of the series of sample images acquired according to embodiments of the present invention. Data such as a partial derivative of the fluorescence response such as the photon count $I_j^{(n)}$ with respect to the illumination parameter such as the illumination intensity or energy $P_k$ for the cycle n, i.e. $\partial I_j^{(n)}/\partial P_k$, and a partial derivative of the bleaching behaviour descriptor such as the rate constant $\kappa_j$ with respect to the illumination parameter such as the illumination intensity or energy $P_k$ for the cycle n, i.e. $\partial \kappa_j^{(n)}/\partial P_k$, are determined in a step 16. On this basis, a value of the illumination parameter such as the illumination intensity or energy $P_k$ for the next cycle n+1, i.e. $P_k^{(n+1)}$, is calculated which is then used in step 13 in the next cycle n+1.

In the microscope system according to embodiments of the present invention, the fluorescence microscope may be selected from a widefield microscope, a confocal microscope, a multiphoton microscope, and a lightsheet microscope, as generally known per se.

A computer program with a program code for performing the of the methods as described in different embodiments above when the computer program is run on a processor, when implemented in a control unit of a microscope system as described, or an embodiment thereof, is also provided.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100 fluorescence microscope
200 control unit or computer system
202 communication pathways
300 sample
110 microscope stand
120 focus adjustment means
130 sample stage
140 tubus optics
142 eyepieces
150 electronic camera
160 lens turret
162 lens
170 fluorescence illumination unit
172 light source
174 illumination optics
176 filter cube

The invention claimed is:

1. A method for examining a fluorescent sample containing a target fluorophore j using a fluorescence microscope, the method comprising:
acquiring a series of sample images over an acquisition time interval of a time-lapse experiment,
adjusting an illumination parameter $P_k$ in a plurality of iteration steps n during the acquisition time interval to different set values, wherein the series of sample images are acquired after adjusting the illumination parameter $P_k$ in at least some of the plurality of iteration steps n, and
determining a bleaching behaviour descriptor $\kappa_j$ indicative of a bleaching behaviour of the target fluorophore j and a fluorescence response descriptor $I_j$ indicative of a fluorescence response of the target fluorophore j for the set values of the illumination parameter $P_k$ in at least some of the plurality of iteration steps n,
wherein the illumination parameter $P_k$ is adjusted, for at least some of the plurality of iteration steps n, based on the bleaching behaviour descriptor $\kappa_j$ and the fluorescence response descriptor $I_j$ as determined in a preceding one of the plurality of iteration steps n.

2. The method according to claim 1, wherein the bleaching behaviour descriptor $\kappa_j$ is determined as a rate constant or a coefficient indicative of a fluorescence decay of the target fluorophore j.

3. The method according to claim 2, wherein determining the bleaching behaviour descriptor $\kappa_j$ includes determining abundances of the target fluorophore j in at least two sample images of the series of sample images at subsequent time points during at least some of the plurality of iteration steps n.

4. The method according to claim 3, wherein determining the abundances includes determining a statistical descriptor of a histogram of an abundance distribution of the target fluorophore j in the at least two sample images.

5. The method according to claim 3, wherein the target fluorophore j is one of two or more fluorophores, and wherein determining the abundances of the target fluorophore j includes applying a spectral unmixing to a fluorescence response generated by the two or more fluorophores.

6. The method according to claim 3, wherein the fluorescence response descriptor $I_j$ is determined as a photon number corresponding to a number of photons collected for the target fluorophore j in the series of sample images for the set values of the illumination parameter $P_k$.

7. The method according to claim 6, wherein the photon number is determined based on a measurement using a photon counting system or a photomultiplier, or is calculated based on calibration data of a camera chip.

8. The method according to claim 1, wherein the adjusting of the illumination parameter $P_k$ includes an illumination parameter computation performed based on an optimization, the optimization minimizing a deviation between a determined value and a target value of the fluorescence response descriptor $I_j$.

9. The method according to claim 8, wherein at least one of the illumination parameter computation, the determination of the fluorescence descriptor $I_j$, and the determination of the bleaching behaviour descriptor $\kappa_j$ includes filtering using at least one of a Kalman filter and a H-infinity filter.

10. The method according to claim 1, wherein a deviation of the fluorescence response descriptor $I_j$ from a target value is balanced with an upper limit for the bleaching behaviour descriptor $\kappa_j$.

11. The method according to claim 1, wherein the illumination parameter $P_k$ is an illumination intensity.

12. A microscope system comprising a fluorescence microscope and a control unit, the control unit being configured to perform a method for examining a sample containing a target fluorophore j using the fluorescence microscope, the method comprising:
acquiring a series of sample images over an acquisition time interval of a time-lapse experiment,
adjusting an illumination parameter $P_k$ in a plurality of iteration steps n during the acquisition time interval to different set values, wherein the series of sample images are acquired after adjusting the illumination parameter $P_k$ in at least some of the plurality of iteration steps n, and
determining a bleaching behaviour descriptor $\kappa_j$ indicative of a bleaching behaviour of the target fluorophore j and a fluorescence response descriptor $I_j$ indicative of a fluorescence response of the target fluorophore j for the set values of the illumination parameter $P_k$ in at least some of the plurality of iteration steps n,
wherein the illumination parameter $P_k$ is adjusted, for at least some of the plurality of iteration steps n, based on the bleaching behaviour descriptor $\kappa_j$ and the fluorescence response descriptor $I_j$ determined in a preceding one of the plurality of iteration steps n.

13. The microscope system according to claim 12, wherein the fluorescence microscope is one of a widefield microscope, a confocal microscope, a multiphoton microscope, or a lightsheet microscope.

14. A non-transitory computer-readable medium having a program code stored thereon, the program code, when executed by a computer processor, causing performance of a method for examining a fluorescent sample containing a target fluorophore j using a fluorescence microscope, the method comprising:
acquiring a series of sample images over an acquisition time interval of a time-lapse experiment,
adjusting an illumination parameter $P_k$ in a plurality of iteration steps n during the acquisition time interval to different set values, wherein the series of sample images are acquired after adjusting the illumination parameter $P_k$ in at least some of the plurality of iteration steps n, and
determining a bleaching behaviour descriptor $\kappa_j$ indicative of a bleaching behaviour of the target fluorophore j and a fluorescence response descriptor $I_j$ indicative of a fluorescence response of the target fluorophore j for the set values of the illumination parameter $P_k$ in at least some of the plurality of iteration steps n,
wherein the illumination parameter $P_k$ is adjusted, for at least some of the plurality of iteration steps n, based on the bleaching behaviour descriptor $\kappa_j$ and the fluorescence response descriptor $I_j$ as determined in a preceding one of the plurality of iteration steps n.

* * * * *